Dec. 7, 1954     A. G. PERKINS     2,696,194
CONTROL DEVICE FOR MILKING MACHINES
Filed June 19, 1952     2 Sheets-Sheet 1
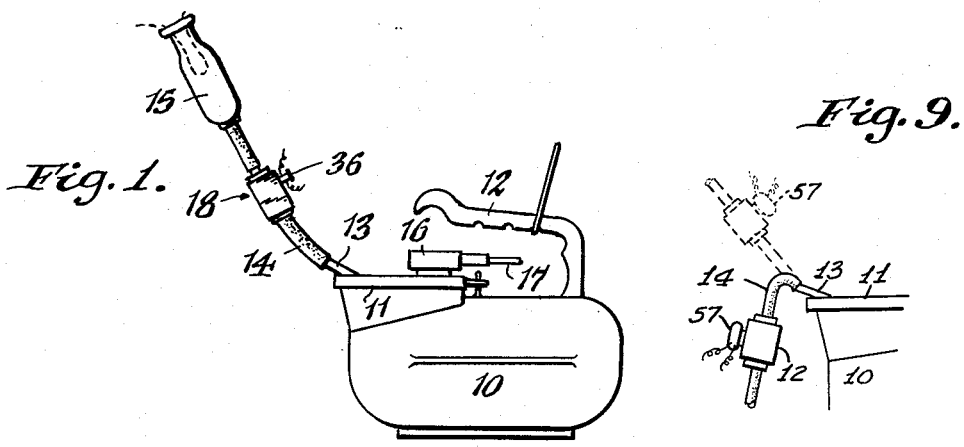
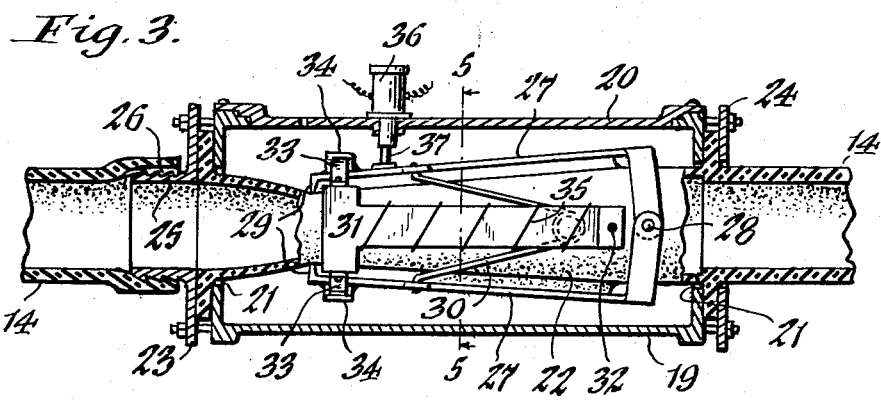
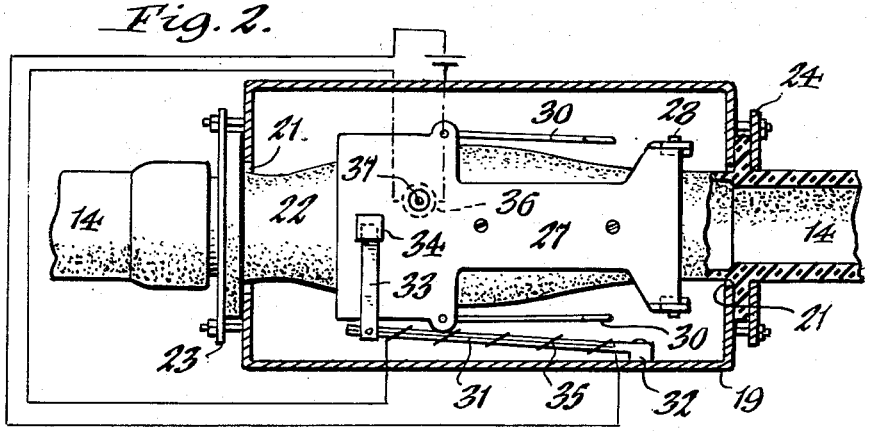
Inventor,
Albert G. Perkins
by Walter P. Guyer
Attorney.

Dec. 7, 1954  A. G. PERKINS  2,696,194
CONTROL DEVICE FOR MILKING MACHINES
Filed June 19, 1952  2 Sheets-Sheet 2
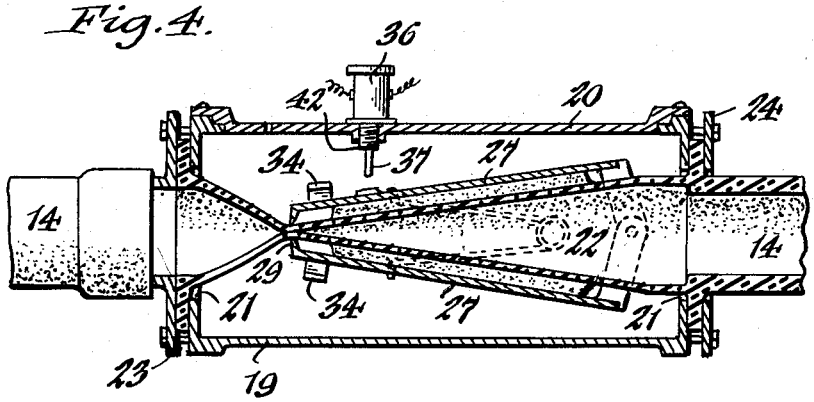
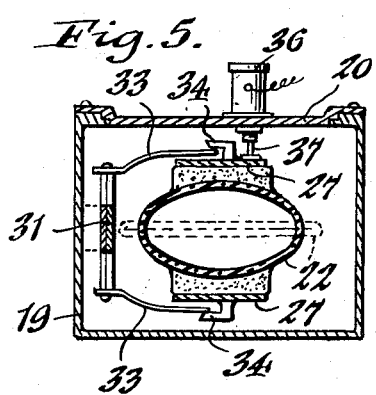
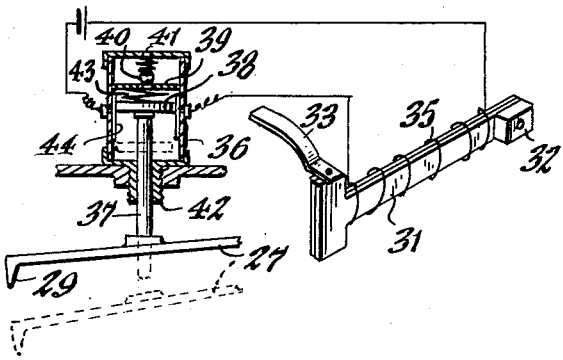
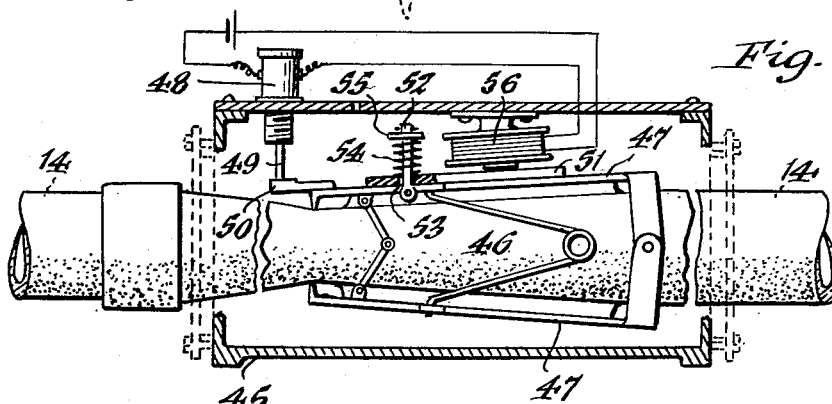
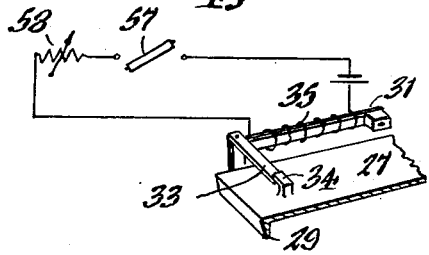
Inventor,
Albert G. Perkins
by Lorens P. Guyer
Attorney.

United States Patent Office 2,696,194
Patented Dec. 7, 1954

2,696,194

CONTROL DEVICE FOR MILKING MACHINES

Albert G. Perkins, Grand Island, N. Y.

Application June 19, 1952, Serial No. 294,404

17 Claims. (Cl. 119—14.08)

This invention relates to an automatic control for milking machines for causing the shutting off of the vacuum to the teat cups when the respective quarters of the cow's bag are milked and thereby prevent injury to the cow when the machine is left on too long.

One of its objects is to provide a control device of this character having a milk-flow tube contracting valve-like assembly adapted to be interposed in a teat cup connection and which employs electrically controlled latching means for resisting or restraining the collapse or contraction of such tube over a predetermined time period, as during normal milk flow conditions but which functions to effect the unlatching of such means to permit the collapse of the contractible tube to shut off the vacuum to the companion teat cup after a predetermined time lapse or when the flow of milk therethrough substantially ceases.

Another object of the invention is to provide a self-contained teat cup connection control device which is simple and compact in construction and positive in operation, and so designed through the medium of electrically governed latching means to releasably restrain the valve-like milk flow tube against collapse to a closed position, except at some desired milking period or when the companion quarter of the cow's bag is milked out, and yet allow for the fluctuating or partial contracting movements of the milk flow tube which take pace during the normal cycles of operation of the milking machine.

Other features of the invention reside in the construction and arrangement of parts hereinafter described and particularly pointed out in the appended claims.

In the accompanying drawings:

Figure 1 is a side view of a milking machine showing my improved control device interposed in one of the teat cup connections thereof. Figure 2 is an enlarged sectional top plan view of the device. Figure 3 is an enlarged sectional elevation of the device in its normal milking position. Figure 4 is a similar view thereof in its shut off position. Figure 5 is a cross section taken on line 5—5, Figure 3. Figure 6 is an enlarged vertical section of the control switch with the thermostatic latch control in circuit therewith. Figure 7 is a sectional elevation of a modified form of the invention. Figure 8 is a fragmentary sectional diagrammatic view of another modification of my invention. Figure 9 is a fragmentary side view showing the switch mounting of the modification shown in Figure 8.

Similar characters of reference indicate corresponding parts throughout the several views.

By way of example, I have shown my control device applied to a well known type of milking machine, wherein 10 indicates the milk receiving can having a cover 11 and bail 12, the cover having the usual milk intake tubes 13 radiating therefrom and each connected by a flexible hose or teat connection 14 having a teat cup 15 at its free end for detachable connection to one of the cow's teats. Also applied to the cover is the customary pulsator 16 which is connected by a hose 17 to the suction source. One of the improved control units 18 is interposed in each hose connection for the flow of milk therethrough and it functions, firstly, as a valve to automatically shut off the vacuum as the companion quarter of the cow's bag is milked out and cause its teat cup to drop from the cow to effectually prevent injury to the cow from overmilking and secondly, as a means for yieldingly resisting or restraining over a predetermined time period, as during the cycling pulsations which take place under normal milk flow conditions, any urge or tendency of such valve to shut off the vacuum so as not to interfere with the normal surge of milk from the cow to the container. It is to be understood that one of these control units is associated with the teat cups so that as each quarter of the cow's bag is milked out the vacuum thereto will be automatically shut off and the companion teat cup will be released and drop by gravity from the cow.

The improved control unit consists of a hollow body or casing 19 adapted to be interposed in the teat cup connection and constituting a support or housing for its working parts and having a removable wall or cover 20 at one side thereof and axially-alined openings 21 in its opposite ends which communicate with the teat cup connection. Extending lengthwise through this casing in spaced relation to its surrounding walls and suitably supported at its ends axially of such openings and in interposed flow communication with the companion intake and discharge sections of the companion teat cup connection 14, is a flexible, contractible tube-like conduit section or valve member 22 of rubber or like material which is subject to collapse by vacuum to a closed position. The opposite ends of the contractible tube section are joined to the casing by clamping plates 23, 24 or the like and one of these plates may have a nipple 25 formed thereon to which the cup-attached end of the teat connection is connected, a capillary vent-like passage 26 being disposed between the latter and such nipple to properly vent the teat cup connection to the atmosphere after the tube-section 22 has been collapsed or contracted as hereinafter described, to permit the teat cup to automatically drop from the cow. A similar vent passage (not shown) is provided between the can intake tube 13 and the attaching end of the connection 14 to properly vent the control device to restore the collapsed tube section 22 and its associated parts to their initial position after the teat cup drops from the cow.

Applied to diametrically opposite sides of the contractible tube section 22 in embracing relation thereto are plates 27 hinged to each other at 28 in substantially the axial plane thereof and provided at their free ends with jaws 29 for biting into and uniformly sealing the tube section in its contracted position, shown in Figure 3, to shut off the vacuum to the teat cup when the flow of milk substantially ceases. A spring 30 disposed between and joined to these jaw plates at each side of the tube section facilitates their movement to an expanded position.

For the purpose of yieldingly resisting or restraining the collapse of the tube section 22 over predetermined time periods during the cycling operations of the milking machine and at such times that the cow may let down on her milking, and preventing its collapse to shut off the vacum to the teat cup until the flow of milk from the companion quarter of the cow's bag substantially ceases, I provide an electrically-controlled latching means in governing relation to the jaw-plates 27. This latching means is designed to permit the partial contracting and expanding fluctuations of the tube section that take place during normal milking operations and functions as a time control element to prevent such means being released except when the flow of milk through the tube section has substantially ceased. To this end this latching means preferably consists of a laterally-displaceable thermostatic bar 31 of bimetal disposed alongside the tube section 22 and fixed at one end at 32 to the casing 19 and provided at its opposite or free end with upper and lower transversely-disposed, yieldable latching elements 33 which overlie the outer faces of the companion jaw-plates 27 and normally engage at their free ends beneath hooks or keepers 34 applied to such plates to yieldingly restrain the tube section against collapse. An electric heating coil 35 is applied to the thermostatic bar and is included in a switch-controlled circuit governed by one of the hinged tube-plates, such circuit remaining closed during the normal fluctuations of the tube section 22 to energize the heating coil and distend the bar 31 with its latch elements 33 inwardly or toward the tube and into latching engagement with the plate-hooks 34 to restrain the tube section against complete collapse. The control switch consists generally of a dash-pot like assembly with the cylinder 36 attached to the casing 19 with its axis in the intersecting plane of one of the jaw-plates 27 and the stem 37 of its plunger 38 depending into abutting engagement with such jaw-plate. The cylinder, by preference, is made of an insulating material, and it has a partition 39 therein defining upper and lower chambers in communication with each other through the medium of a downwardly-closing check valve 40, the upper chamber having a port 41 therein opening into the atmosphere and the lower chamber in which the plunger operates communicating with the atmosphere through a capillary space formed between the plunger-stem and a guide-sleeve 42 formed at the lower end of the cylinder. A light spring 43 interposed between the partition 39 and the plunger 38 normally urges the latter downwardly into abutting engagement with the opposing jaw-plate 27. Disposed within the lower cylinder-chamber and extending from its upper end to a point short of its lower end is a switch contact 44 included in the circuit of the heating coil 35 and normally engaged by the plunger which is made of an electrical conducting material and serves as the companion or movable switch contact. By this construction, the switch-contacts remain engaged over a portion of the plunger-stroke to maintain the circuit of the heating coil closed and the jaw-plates latched during time periods consumed in the normal fluctuations of the contractiblle tube section. However, when the flow of milk substantially ceases, the tube section collapses, due to the constancy of the vacuum, and the plunger 38 is displaced downwardly out of the contact range of the cylinder contact 44 with the result that the circuit is opened, the heating coil 35 is de-energized, and the thermostatic bar 31 is deflected outwardly to release its latching elements 33 from the hooks 34 on the jaw-plates so that the tube section is no longer restrained against contraction and is free to be collapsed to the vacuum shut-off position.

In the use of the device disclosed in Figures 1–6, the teat connection or hose 14 in which the control unit 18 is interposed is connected to the milking machine can 10 and the circuit of the coil 35 of the thermostatic bar 31 is closed or plugged in, which results in the inward displacement of such bar to its latching position, after which the teat cup 15 is connected to the cow. Assuming the milking machine to be now in operation and the milk surging through the control unit from the cow to the can, the parts will assume generally the position shown in Figure 3 and that shown by full lines in Figures 5 and 6 wherein the control switch 38, 44 is closed and the latching elements 33, 34 are engaged to permit the tube section 22 to partially contract and expand or fluctuate more or less with the pulsations in the system during normal milk flow conditions, but yieldingly restrain its complete collapse to a closed or sealed position to cut off the vacuum to the teat cup until such time as the latching elements are automatically released, as when the flow of milk substantially ceases. During this operation the switch-plunger 38 has its stem 37 in abutting contact with the opposing jaw plate 27 and it rises and falls in response to the fluctuations of the tube section but during this period the circuit remains closed to retain the latch elements engaged. When the surge of milk substantially ceases and the vacuum becomes constant, the tube section collapses further and the plunger-switch is caused to seek its open position to cut off the thermostatic coil 35 with the result that the thermostatic bar 31 is retracted outwardly to release its latching elements 33 from the jaw plate keepers 34 and allow the tube section to be collapsed to its closed position shown in Figure 4. With the collapse of the tube section and its jaw plates, the plunger-switch is yieldingly retained in its open position with the stem 37 thereof out of abutting engagement with the opposing contracted jaw plate, and the vacuum is cut off to the teat cup which thereupon drops from the cow. With the eventual venting and inflation of the tube section, the parts are restored to their original expanded position.

In the modified form of the invention shown in Figure 7, the latching of the tube section against complete collapse during normal milk flow conditions is effected magnetically while the remaining construction of the control device is substantially the same, and wherein 45 indicates the casing, 46 the collapsible tube section, 47 the embracing jaw-plates, 48 the dash-pot like switch included in the circuit of a magnetic control and having its movable switch-actuating stem 49 in abutting engagement with an arm 50 projecting from the free end of the adjacent jaw-plate. Applied to the outer face of each of the non-magnetic jaw-plates 47 is a steel plate or armature 51 which is free to be displaced toward and from the same but is retained against lateral displacement by a pin 52 pivoted or otherwise joined to the companion jaw-plate and rising therefrom and extending freely through an opening 53 in the armature plate. A light spring 54 is applied to this pin to normally urge the armature plate toward the face of its companion jaw-plate, the spring bearing at one end against such armature-plate and at its other end against an abutment 55 on the pin. An electro-magnet 56 is mounted on the casing in overlying operative relation to the armature 51 and its coil is included in the circuit of the switch 48, so that during normal milk flow conditions this circuit is maintained closed to energize the electro-magnet and draw the armature 51 toward it and sufficiently from the face of its jaw-plate to permit the latter to fluctuate with the tube section under such conditions but yieldingly restrain its complete collapse until the flow of milk substantially ceases, at which time the control switch 48 is opened and the jaw-plate armature is released or unlatched from its electromagnet to allow for its joint displacement with the jaw-plate and the collapse of the tube section to its vacuum shut-off position.

In the modification shown in Figure 8, the device is adapted to be adjusted for predetermined time periods of milking so that after the lapse of a selected or set time period of adjustment the contractible tube section will collapse under vacuum to its closed position to shut off the vacuum to the companion teat cup with the result that the latter drops from the cow. To this end, the dash-pot like control switch 36 is dispensed with while the latching elements 33 and 34 as well as the associated thermostatic bar 31 and its heating coil 35 are retained, the same reference characters being correspondingly applied thereto. Included in the circuit of the heating coil is a mercury or gravity-controlled switch 57 which may be applied to the teat connection 14 or to the body 19 of the device, as shown in Figure 9, so that in the dropped-off or pendant position of the latter from the milk can, shown by full lines in such figure, the contacts of the mercury switch are closed and in the connected operative position of the teat connection on the cow, shown by dotted lines in the same figure, the switch is reversed and the contacts are open. Also included in this circuit, which is adapted to be plugged into a service line when the milking machine is in use and which circuit is automatically opened or closed by the mercury switch depending on the position of the teat connection, whether connected to the cow or pending from the milk can, is a rheostat or adjustable resistance element 58 to regulate the amount of current to be delivered to the heating coil 35 of the thermostatic latch bar 31 and accordingly govern the latching period to yieldingly restrain the tube section 22 against collapse. In operation, assuming the teat connection to be in its pendant position, the switch 57 is closed and the rheostat set to selectively adjust the latching or time element to substantially correspond to a milking period desired for a given quarter of the cow's bag, this period being for say two or three minutes and being predetermined by the time required for the bar 31 to be thermostatically restored from its engaged or expanded position to its released or contracted position and this time period is regulated from the rheostat 58 to effect a higher or lower temperature heating of the thermostatic bar 31 and a correspondingly longer or shorter time element before such bar is cooled down and deflected outwardly to its unlatched position. The closing of the circuit results in the coil 35 being energized to cause the expansion or inward deflection of the thermostatic bar to its tube-latching position to yieldingly restrain the collapse of the tube section 22. When the teat connection is applied to the cow, and this is done after the circuit has been closed for a period sufficient to heat the coil 35 to that determined by the rheostat setting the switch 57 and its governing circuit is opened, so that after the lapse of the predetermined set time of latching and of the corresponding milking period above stated, the thermostatic bar is reduced in temperature and caused to be contracted or displaced outwardly to disconnect the latch elements 33, 34 and permit the unrestrained vacuum collapse of the tube section to its shut-off position.

I claim as my invention:

1. A control device for milking machines, comprising a teat cup connection for conducting milk by vacuum from the cow to a milk receiving container, a casing adapted for interposition in said connection and including a flexible contractible tube section in flow communication with the teat connection, means in substantially embracing relation to said tube section for contractible movement therewith to a closed sealed position, and relatively-displaceable means disposed for releasable coupling engagement with said embracing means for yieldingly restraining contraction of the tube section during normal milk flow conditions and adapted for displacement to a released position to permit the contraction of such tube section at the close of a milking period.

2. A control device for milking machines, comprising a teat cup connection for conducting milk by vacuum from the cow to a milk receiving container, a casing adapted for interposition in said connection and including a flexible contractible tube section in flow communication with the teat connection, means in substantially embracing relation to said tube section for contractible movement therewith to a closed sealed position, and electrically-governed, relatively-displaceable means disposed in operative releasable engagement with said embracing means for yieldingly restraining contraction of the tube section during normal milk flow conditions and adapted for displacement to a released position to permit the contraction of such tube section at the close of a milking period.

3. A control device for milking machines, comprising a teat cup connection for conducting milk by vacuum from the cow to a milk receiving container, a casing adapted for interposition in said connection and including a flexible contractible tube section in flow communication with the teat connection, means in substantially embracing relation to said tube section for contractible movement therewith to a closed sealed position, and electrically-governed, relatively-displaceable means disposed in operative releasable engagement with said embracing means for releasably restraining contraction of the tube section during normal flow conditions and adapted for displacement to a released position to allow for the contraction of such tube section when the flow of milk therethrough substantially ceases, said electrically-governed means including an electric circuit having a switch in operative relation to said embracing means for actuation thereby to and from a circuit-closing position.

4. A control device for milking machines, comprising a teat cup connection for conducting milk by vacuum from the cow to a milk receiving container, a casing adapted for interposition in said connection and including a flexible contractible tube section in flow communication with the teat connection, means in substantially embracing relation to said tube section for contractible movement therewith to a closed sealed position, latching means disposed in operative relation to said embracing means for yieldingly restraining contraction of the tube section during normal flow conditions, and means operatively connected to said latching means for effecting the release thereof to permit the contraction of said tube section to its closed sealed position.

5. A control device for milking machines, comprising a teat cup connection for conducting milk by vacuum from the cow to a milk receiving container, a casing adapted for interposition in said connection and including a flexible contractible tube section in flow communication with the teat connection, means in substantially embracing relation to said tube section for contractible movement therewith to a closed sealed position, latching means disposed in operative relation to said embracing means for yieldingly restraining contraction of the tube section during normal flow conditions, and means disposed alongside and displaceable laterally of said tube section and in operative governing relation to said latching means for controlling the release thereof to allow for the contraction of the tube section to its closed sealed position.

6. A control device for milking machines, comprising a teat cup connection for conducting milk by vacuum from the cow to a milk receiving container, a casing adapted for interposition in said connection and including a flexible contractible tube section in flow communication with the teat connection, means in substantially embracing relation to said tube section for contractible movement therewith to a closed sealed position, latching means including a thermo-electric retractible element and a complemental keeper element disposed in operative relation to said embracing means for automatically governing the contraction of the tube section as determined by the flow conditions of milk through the tube section, said latching means yieldingly restraining complete contraction of the tube section over a given period of time and being releasable to an unlatched position after the lapse of such period to allow for the contraction of the tube section to its closed sealed position.

7. A control device for milking machines, comprising a teat cup connection for conducting milk by vacuum from the cow to a milk receiving container, a casing adapted for interposition in said connection and including a flexible contractible tube section in flow communication with the teat connection for collapse to a closed position by the vacuum when the flow of milk therethrough substantially ceases, a laterally-displaceable bar mounted in said casing alongside said tube section, and complementary latching means applied to said bar and said tube section for yieldingly resisting collapse of the latter in an inwardly displaced position of the bar, and releasable to an unlatched position in an outwardly displaced position of the bar to permit the contraction of said tube section to its closed position.

8. A control device for milking machines, comprising a teat cup connection for conducting milk by vacuum from the cow to a milk receiving container, a casing adapted for interposition in said connection and including a flexible contractible tube section in flow communication with the teat connection for collapse to a closed position by the vacuum when the flow of milk therethrough substantially ceases, and complementary latching means applied to said casing and said tube section for yieldingly resisting collapse of the latter during normal milk flow conditions and releasable to an unlatched position to permit the contraction of said tube section to its closed position when the flow of milk therethrough substantially ceases, one of the complemental latching means consisting of a keeper applied to the tube section and the other including a laterally-displaceable bar applied to the casing and having yieldable latching elements releasably engageable with said keeper.

9. A control device for milking machines, comprising a teat cup connection for conducting milk by vacuum from the cow to a milk receiving container, a casing adapted for interposition in said connection and including a flexible contractible tube section in flow communication with the teat connection for collapse to a closed position by the vacuum when the flow of milk therethrough substantially ceases, and complementary latching means applied to said casing and said tube section for yieldingly resisting collapse of the latter during normal milk flow conditions and releasable to an unlatched position to permit the contraction of said tube section to its closed position when the flow of milk therethrough substantially ceases, one of the complemental means including a retractible, electrically-governed element in latching engagement with said tube section to prevent its collapse to a closed position during normal flow conditions, and an electric circuit including said retractible element and a switch, the latter being normally closed and disposed in operative governing relation to said tube section and rendered displaceable to an open position to cause the retraction of said latching element to an unlatched position when the flow of milk through the tube section substantially ceases.

10. A control device for milking machines, comprising a teat cup connection for conducting milk by vacuum from the cow to a milk receiving container, a casing adapted for interposition in said connection and including a flexible contractible tube section in flow communication with the teat connection for collapse to a closed position by the vacuum when the flow of milk therethrough substantially ceases, and complementary latching means applied to said casing and said tube section for yieldingly resisting collapse of the latter during normal milk flow conditions and releasable to an unlatched position to permit the contraction of said tube section to its closed position when the flow of milk therethrough substantially ceases, one of the complemental means including a thermo-retractible member having an electrical heating element associated therewith, an electric circuit including said heating element, and a control switch in said circuit and in operative governed relation to the contractible tube section for maintaining said circuit closed and said complemental means latched during normal milk flow conditions and for causing the opening of said circuit and the unlatching of said complemental means when the flow of milk through the tube section substantially ceases.

11. A control device for milking machines, comprising a teat cup connection for conducting milk by vacuum from the cow to a milk receiving container, a casing adapted for interposition in said connection and including a flexible contractible tube section in flow communication with the teat connection for collapse to a closed position by the vacuum when the flow of milk therethrough substantially ceases, and complementary latching means applied to said casing and said tube section for yieldingly resisting collapse of the latter during normal milk flow conditions and releasable to an unlatched position to permit the contraction of said tube section to its closed position when the flow of milk therethrough substantially ceases, one of the complemental means including a thermo-retractible member having an electrical heating element associated therewith, an electric circuit including said heating element, and a switch in said circuit and in operative governed relation to the contractible tube section for displacement thereby to and from a circuit-closing position, said switch being maintained closed except at such times that the flow of milk through said tube section substantially ceases.

12. A control device for milking machines, comprising a teat cup connection for conducting milk by vacuum from the cow to a milk receiving container, a casing adapted for interposition in said connection and including a flexible contractible tube section in flow communication with the teat connection for collapse to a closed position by the vacuum when the flow of milk therethrough substantially ceases, and complementary latching means applied to said casing and said tube section for yieldingly resisting collapse of the latter during normal milk flow conditions and releasable to an unlatched position to permit the contraction of said tube section to its closed position when the flow of milk therethrough substantially ceases, one of the complemental means including a thermo-retractible member having an electrical heating element associated therewith, an electric circuit including said heating element, and a switch in said circuit including a movable member in governed relation to said contractible tube section to move in response thereto to and from a switch-closing position, and a stationary member over which said movable member is adapted to travel for a predetermined contact period to maintain said circuit closed during normal flow conditions and to cause the opening of such circuit when such flow substantially ceases.

13. A control device for milking machines, comprising a teat cup connection for conducting milk by vacuum from the cow to a milk receiving container, a casing adapted for interposition in said connection and including a flexible contractible tube section in flow communication with the teat connection for collapse to a closed position by the vacuum when the flow of milk therethrough substantially ceases, and complementary latching means applied to said casing and said tube section for yieldingly resisting collapse of the latter during normal milk flow conditions and releasable to an unlatched position to permit the contraction of said tube section to its closed position when the flow of milk therethrough substantially ceases, one of the complemental means including a thermo-retractible member having an electrical heating element associatd therewith, an electric circuit including said heating element, and a switch in said circuit including a dash-pot-like cylinder having a contact extending axially thereof for a portion of its length and constituting the stationary element of the switch, and a plunger operable in said cylinder constituting the movable element of the switch for engagement with said stationary contact element during a portion of its stroke, said plunger having a stem in abutting engagement with said tube section for governing its displacement to and from a switch-closing position as determined by the degree of contraction of such section, and a spring for normally urging the same toward the tube section.

14. A control device for milking machines, comprising a teat cup connection for conducting milk by vacuum from the cow to a milk receiving container, a casing adapted for interposition in said connection and including a flexible contractible tube section in flow communication with the teat connection, means in substantially embracing relation to said tube section for contractible movement therewith to a closed sealed position, complemental latching elements disposed in operative relation to said embracing means for normally yieldingly restraining contraction of the tube section during normal milk flow conditions, one of the latching elements consisting of a keeper applied to said embracing means and the companion element including a displaceable bar connected at one end to said casing and having a yieldable arm at its free end for releasable engagement with the companion keeper.

15. A control device for milking machines, comprising a teat cup connection for conducting milk by vacuum from the cow to a milk receiving container, a casing adapted for interposition in said connection and including a flexible contractible tube section in flow communication with the teat connection, an electric circuit including a switch in governed relation to said contractible tube section for maintaining the circuit closed during normal vacuum and liquid flow conditions and for causing the opening of said switch when the liquid flow substantially ceases, and electrically-controlled releasable means in operative relation to said tube section and included in said switch circuit for yieldingly restraining the collapse of said tube section when such circuit is closed and for releasing the tube section for collapse to a closed position when the circuit is opened.

16. A control device for milking machines, comprising a teat cup connection for conducting milk by vacuum from the cow to a receiving container, a casing adapted for interposition in said connection and including a flexible contractible tube section in flow communication therewith and subject to collapse by vacuum, latching means in operative relation to said tube section to yieldingly latch the same against collapse during a given milking period and displaceable to an unlatched position to permit the contraction of such tube section at the close of the milking period, the latching means including a thermostatically controlled element having a heating coil thereon, an electric circuit including said coil, a gravity-controlled switch applied to the teat connection to assume a closed position when the latter is off the cow and an open position when in a milking position on the cow and a regulator for governing the amount of current delivered to said coil to effect a higher or lower temperature heating of said thermostatic element and a correspondingly longer or shorter milking period.

17. A control device for milking machines, comprising a teat cup connection for conducting milk by vacuum from the cow to a milk receiving container, a casing adapted for interposition in said connection and including a flexible contractible tube section in flow communication with the teat connection for collapse to a closed position by the vacuum when the flow of milk therethrough substantially ceases, and electrically-controlled latching means in operative relation to said tube section to releasably and yieldingly latch the same against collapse over a given time period, one of the latching elements consisting of a keeper and the companion element including a displaceable thermostatic bar having a yieldable arm thereon for releasable engagement with said keeper.

References Cited in the file of this patent

UNITED STATES PATENTS

| Number | Name | Date |
|---|---|---|
| 640,206 | Klein et al. | Jan. 2, 1900 |
| 835,918 | Sabroe | Nov. 13, 1906 |
| 952,978 | Cramp | Mar. 22, 1910 |
| 976,305 | Sharples | Nov. 22, 1910 |
| 1,385,049 | Holmes | July 19, 1921 |
| 2,496,307 | Perkins | Feb. 7, 1950 |
| 2,538,652 | Perkins et al. | Jan. 16, 1951 |
| 2,572,658 | Perkins | Oct. 23, 1951 |
| 2,576,808 | Perkins | Nov. 27, 1951 |
| 2,614,530 | Perkins | Oct. 21, 1952 |